US012665816B2

(12) United States Patent
Dalal et al.

(10) Patent No.: US 12,665,816 B2
(45) Date of Patent: Jun. 23, 2026

(54) DISTRIBUTED MACHINE LEARNING

(71) Applicant: Telefonaktiebolaget LM Ericsson (publ), Stockholm (SE)

(72) Inventors: Hardik Dalal, Montreal (CA); Emmanuel Thepie Fapi, Côte-Saint-Luc (CA); Zhongwen Zhu, Saint-Laurent (CA); Ben Liang, Whitby (CA); Jingrong Wang, Victoria (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 80 days.

(21) Appl. No.: 18/715,751

(22) PCT Filed: Dec. 17, 2021

(86) PCT No.: PCT/IB2021/061946
§ 371 (c)(1),
(2) Date: Jun. 3, 2024

(87) PCT Pub. No.: WO2023/111658
PCT Pub. Date: Jun. 22, 2023

(65) Prior Publication Data
US 2025/0039061 A1     Jan. 30, 2025

(51) Int. Cl.
*H04L 41/14* (2022.01)
*H04L 41/16* (2022.01)

(52) U.S. Cl.
CPC ............ *H04L 41/145* (2013.01); *H04L 41/16* (2013.01)

(58) Field of Classification Search
None
See application file for complete search history.

(56) References Cited

U.S. PATENT DOCUMENTS

| | | | |
|---|---|---|---|
| 2014/0328214 A1* | 11/2014 | Iovanna | H04L 45/302 370/254 |
| 2020/0195007 A1* | 6/2020 | Sun | H02J 3/0073 |

OTHER PUBLICATIONS

Lin Xiao et al., "Fast Linear Iterations for Distributed Averaging", Systems & Control Letters, vol. 53, Issue 1, Sep. 2004, pp. 65-78.
(Continued)

*Primary Examiner* — Fadi Haj Said
(74) *Attorney, Agent, or Firm* — Sonoda & Kobayashi Intellectual Property Law; Sarvajit S. Patil

(57) ABSTRACT

A method (700) for distributed machine learning, ML, using a set of N CDs. The method includes obtaining first topology information, wherein, for each CD included in the set of N CDs, the first topology information identifies other CDs included in the set of N CDs to which the CD is connected, thereby identifying a set of CD pairs. The method also includes obtaining first network state information, wherein, for each CD included in the set of N CDs, the first network state information comprises a network state vector for the CD, wherein the network state vector for the CD comprises, for each other CD to which the CD is indicated as being connected by the first topology information, a determined network state value. The method further includes determining a consensus weight matrix (W) using the obtained first network state information and the first topology information.

15 Claims, 8 Drawing Sheets

700 s702
obtaining first topology information s704
obtaining first network state information s706
using the first topology information and the first network state information, determining a consensus weight matrix, W

(56)                    References Cited

OTHER PUBLICATIONS

Giovanni Neglia et al., "The Role of Network Topology for Distributed Machine Learning", IEEE Infocom 2019—IEEE Conference on Computer Communications, Apr. 2019, Paris, France. pp. 2350-2358, DOI: 10.1109/INFOCOM40694.2019.

Huihui Wang et al., "Group-Based Alternating Direction Method of Multipliers for Distributed Linear Classification", IEEE Transactions on Cybernetics, vol. 47, No. 11, Nov. 2017, pp. 2568-3582.

Mingzhe Chen et al., "Convergence Time Minimization of Federated Learning over Wireless Networks", ICC 2020—2020 IEEE International Conference on Communications (ICC), DOI: 10.1109/ICC40277.2020, Jun. 7-11, 2020.

Mingzhe Chen et al., "A Joint Learning and Communications Framework for Federated Learning Over Wireless Networks", Journals & Magazines, IIEEE Transactions on Wireless Communications, vol. 20, Issue 1, pp. 269-283, Jan. 2021, DOI:10.1109/TWC.2020.3024629.

Zeyu Meng et al., "Learning-Driven Decentralized Machine Learning in Resource-Constrained Wireless Edge Computing", IEEE Infocom 2021—IEEE Conference on Computer Communications, May 10-13, 2021, DOI: 10.1109/INFOCOM42981.2021.9488817.

Joost Verbraeken et al., "A Survey on Distributed Machine Learning", ACM Journals, ACM Computing Surveys, vol. 53, No. 2, Article No. 30, pp. 1-33, Publication date: Mar. 2020, https://doi.org/10.1145/3377454.

Martin A. Zinkevich et al., "Parallelized Stochastic Gradient Descent", NeurIPS Proceedings, Part of Advances in Neural Information Processing Systems 23 (NIPS 2010).

Ofer Dekel et al., "Optimal Distributed Online Prediction Using Mini-Batches", Journal of Machine Learning Research, vol. 13, 2012, pp. 165-202, https://doi.org/10.48550/arXiv.1012.1367.

Alexander Sergeev et al., "Horovod: fast and easy distributed deep learning in TensorFlow", arXiv:1802.05799v3, 2018.

Angelia Nedic et al., "Distributed Subgradient Methods for Multi-Agent Optimization", IEEE Transactions on Automatic Control, vol. 54, No. 1, Jan. 2009.

Zhanhong Jiang et al., "Collaborative Deep Learning in Fixed Topology Networks", NIPS'17: Proceedings of the 31st International Conference on Neural Information Processing Systems, Dec. 2017, pp. 5906-5916.

Angelia Nedić et al., Network Topology and Communication-Computation Tradeoffs in Decentralized Optimization, Proceedings of the IEEE, vol. 106, Issue: 5, May 2018, pp. 953-976, arXiv:1709.08765v2.

Sebastian U. Stich, "Local SGD Converges Fast and Communicates Little", Published as a conference paper at ICLR 2019, 17 pages, arXiv:1805.09767v3.

Kumar Kshitij Patel et al., "Communication trade-offs for Local-SGD with large step size", 33rd Conference on Neural Information Processing Systems (NeurIPS 2019), Vancouver, Canada, 12 pages.

Dan Alistarh et al., "QSGD: Communication-Efficient SGD via Gradient Quantization and Encoding", 31st Conference on Neural Information Processing Systems (NIPS 2017), Long Beach, CA, USA, 12 pages.

Jianqiao Wangni et al., "Gradient Sparsification for Communication-Efficient Distributed Optimization", 32nd Conference on Neural Information Processing Systems (NeurIPS 2018), Montreal, Canada.

Stephen Boyd et al., "Gossip Algorithms: Design, Analysis and Applications", Proceedings IEEE 24th Annual Joint Conference of the IEEE Computer and Communications Societies, Mar. 13-17, 2005, DOI: 10.1109/INFCOM.2005.1498447.

Konstantinos I. et al., "Push-Sum Distributed Dual Averaging for Convex Optimization", 51st IEEE Conference on Decision and Control, Dec. 10-13, 2012, Maui, Hawaii, USA, DOI: 10.1109/CDC.2012.6426375.

Shaohuai Shi et al., "MG-WFBP: Efficient Data Communication for Distributed Synchronous SGD Algorithms", arXiv:1811.11141, arXiv:1811.11141v2.

Ruiliang Zhang et al., "Asynchronous Distributed ADMM for Consensus Optimization", Proceedings of the 31st International Conference on Machine Learning, PMLR, vol. 32, No. 2, pp. 1701-1709, 2014.

Nima Eshraghi et al., "Distributed Online Optimization over a Heterogeneous Network with Any-Batch Mirror Descent", Proceedings of the 37th International Conference on Machine Learning, PMLR, vol. 119, pp. 2933-2942, 2020.

Kunal Srivastava et al., "Distributed Bregman-Distance Algorithms for Min-Max Optimization", Agent-Based Optimization, Chapter, pp. 143-174.

Nonlinear programming, 1.8.1 Coordinate Descent.

Yuyi Mao et al., "Dynamic Computation Offloading for Mobile-Edge Computing With Energy Harvesting Devices", IEEE Journal on Selected Areas in Communications, vol. 34, Issue 12, Dec. 2016, pp. 3590-3605, DOI: 10.1109/JSAC.2016.2611964.

Jingrong Wang et al., "Communication-efficient Distributed Machine Learning with Sparse Graph", IEEE Transactions on Communications, Sep. 24, 2021.

Vivek Khatana et al., "Gradient-Consensus Method for Distributed Optimization in Directed Multi-Agent Networks", 2020 American Control Conference Denver, CO, USA, Jul. 1-3, 2020, DOI: 10.23919/ACC45564.2020.9147544.

Xiangru Lian et al., "Can Decentralized Algorithms Outperform Centralized Algorithms? A Case Study for Decentralized Parallel Stochastic Gradient Descent", 31st Conference on Neural Information Processing Systems (NIPS 2017), Long Beach, CA, USA., 11 pages.

Bo Liu et al., "Distributed Training for Multi-Layer Neural Networks", IEEE Transactions on Neural Networks and Learning Systems, vol. 31, Issue: 5, May 2020, pp. 1771-1778, DOI: 10.1109/TNNLS.2019.2921926.

Yujun Lin et al., "Deep Gradient Compression: Reducing the Communication Bandwidth for Distributed Training", Published as a conference paper at ICLR 2018, 14 pages.

International Search Report and Written Opinion received for PCT/IB2021/061946 dated on Jul. 15, 2022.

* cited by examiner

100

101

106

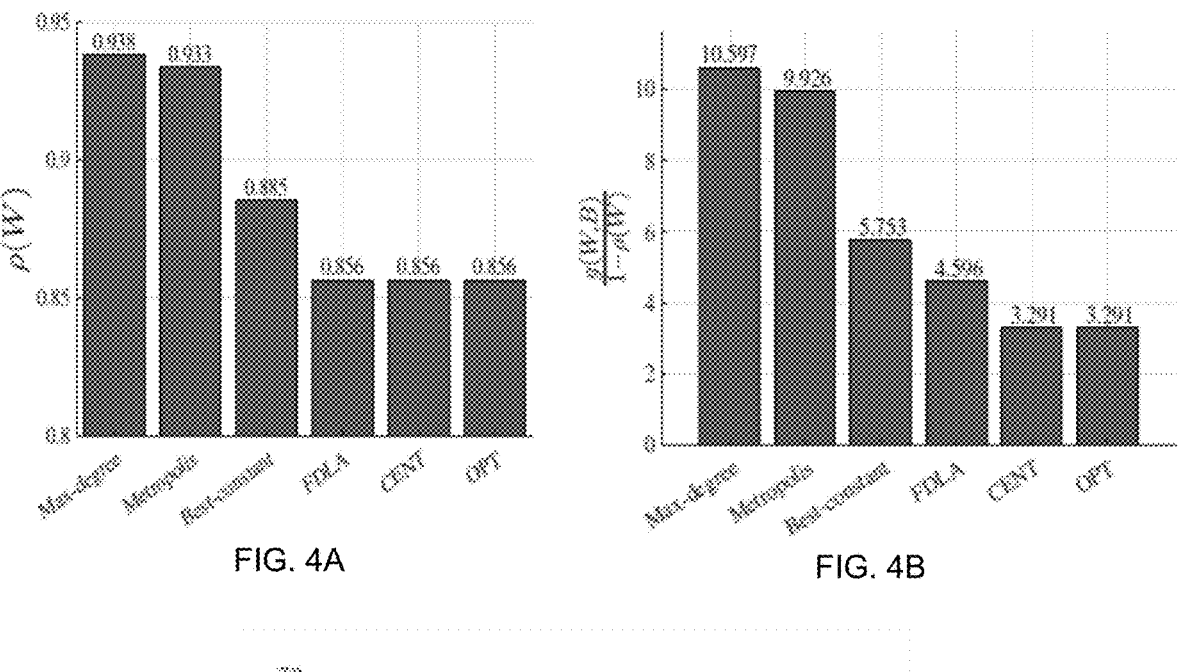
FIG. 4A
FIG. 4B
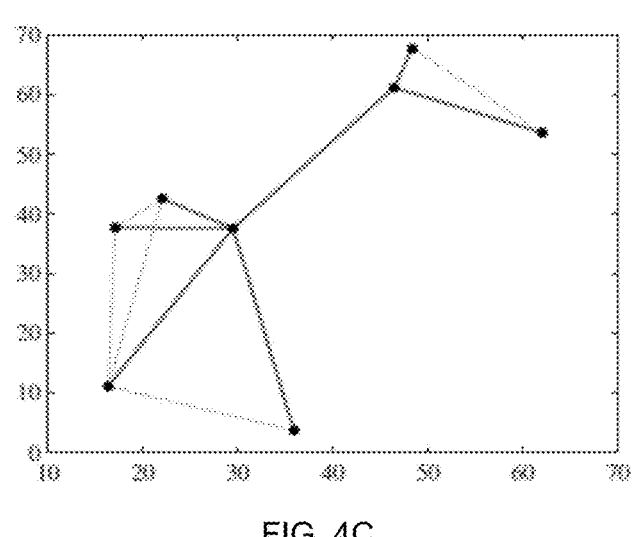
FIG. 4C

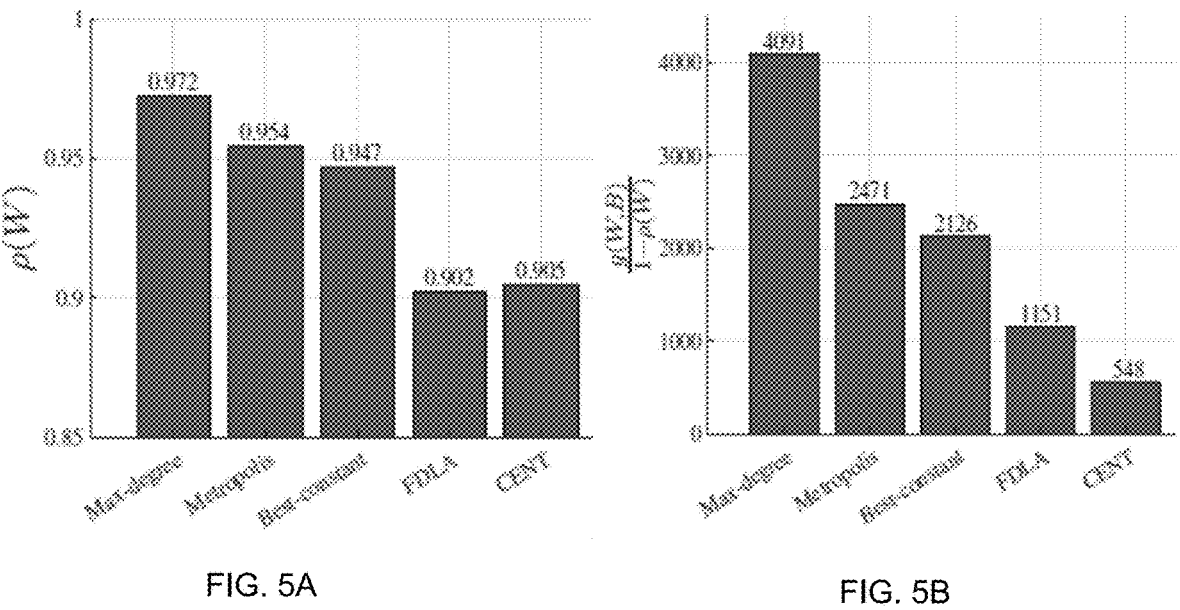
FIG. 5A
FIG. 5B
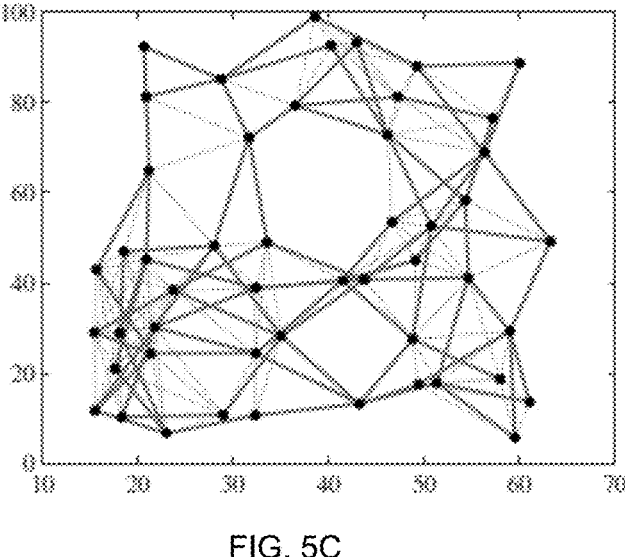
FIG. 5C

700 s702 obtaining first topology information s704 obtaining first network state information s706 using the first topology information and the first network state information, determining a consensus weight matrix, W

DISTRIBUTED MACHINE LEARNING

CROSS-REFERENCE TO RELATED APPLICATIONS

This patent application is a submission under 35 U.S.C. § 371 for U.S. national stage patent application of international application no. PCT/IB2021/061946 filed on Dec. 17, 2021 and entitled "DISTRUBUTED MACHINE LEARNING," the entirety of which is incorporated herein by reference.

TECHNICAL FIELD

Disclosed are embodiments related to distributed machine learning.

BACKGROUND

Distributed machine learning (ML) has gained widespread attention as a way to speed up large-scale ML. The development of communication networks and parallel computing has enabled a shift of distributed ML from the cloud to the network edge. To speed up the ML model training process, communication-efficient learning algorithms have been extensively investigated. Existing research has studied communication frequency (see, e.g., reference [1]), coding and gradient compression (see, e.g., reference [2]), and the overlap of computation and communication (see, e.g., reference [3]).

In a typical distributed ML architecture, a group of computing devices collaboratively train a shared ML model either in a centralized manner (i.e., using parameter server(s) (PS(s)) or in a decentralized manner without the use any PS.

In the centralized architecture, the computing devices need only communicate with a PS, which can easily become a communication bottleneck. A more general, distributed learning architecture (without any centralized PS) uses device-to-device (D2D) networks. The typical process of D2D learning is as follows: (1) a group of computing devices cooperatively train a common model using their local datasets (the training model is estimated locally by each computing device); (2) at each iteration, each computing device (or "device" for short") calculates the local gradients of its local loss function; (3) in the gradient descent step, each device updates its local model with a weighted average of the model estimates from its neighboring devices; (4) the training process repeats until convergence of the training model is reached; and (5) one of the local models can be selected to function as the global model or a global model can be created by averaging some or all of the local models.

In D2D learning, a consensus weight matrix is formed by those weights assigned to the neighbors of all devices for consensus. Some heuristics based a Laplacian matrix of a communication graph representing the group of communication devices and their interconnections, such as, for example, best constant weight, maximum-degree weight, and Metropolis weight, are the common choices of the consensus weight matrix design (see, e.g., reference [4]).

It has been proposed that the fastest distributed linear averaging (FDLA) through spectral norm minimization can be used to find the optimal weight matrix that leads to the fastest convergence rate (see, e.g., reference [4]). In summary, given the topology of the communication graph, FDLA gives the best weight matrix that leads to the fastest convergence rate in terms of the training iterations. At each iteration, the training time consists of both the communication and computation time of the devices.

SUMMARY

Certain challenges presently exist. For example, conventional D2D learning systems generally make use of every physical link between computing devices, which may not be an effective way to speed up the training process. The training time is characterized by multiplying the number of iterations by the expected time of one iteration. In practice, there exists a trade-off between the convergence rate and communication cost when designing the consensus weight matrix. A more connected network may result in fewer iterations to converge (i.e., higher convergence rate), but it also introduces higher communication costs per iteration. In existing work, there has been no discussion on how to set the consensus weight matrix to speed up the training process.

Accordingly, there is provided a method for distributed machine learning, ML, using a set of N computing devices (CDs) (also known as "workers"). The method includes obtaining first topology information, wherein, for each CD included in the set of N CDs, the first topology information identifies other CDs included in the set of N CDs to which the CD is connected, thereby identifying a set of CD pairs. The method also includes obtaining first network state information (e.g., a latency matrix or other network state information), wherein, for each CD included in the set of N CDs, the first network state information comprises a network state vector for the CD, wherein the network state vector for the CD comprises, for each other CD to which the CD is indicated as being connected by the first topology information, a determined network state value (e.g., a performance indicator (PI), such as, for example, a latency value). The method further includes determining a consensus weight matrix (W) using the obtained first network state information and the first topology information.

There is also provided a computer program comprising instructions which when executed by processing circuitry of a network node causes the network node to perform any of the methods disclosed herein. In one embodiment, there is provided a carrier containing the computer program wherein the carrier is one of an electronic signal, an optical signal, a radio signal, and a computer readable storage medium. There is also provided a network node configured to perform any of the methods disclosed herein. The network node may include processing circuitry and a memory containing instructions executable by the processing circuitry whereby the network node is configured to perform any one of the methods disclosed herein.

The embodiments disclosed herein provide several advantages. For example, the embodiments enable a decrease in the amount of time it takes to train an ML model while retaining a training convergence rate. That is, the embodiments reduce the training "wall-clock time" (i.e., end-to-end model training cycle in distributed machine learning), as well as reduce communication cost by using less than all of the available communication links.

BRIEF DESCRIPTION OF THE DRAWINGS

The accompanying drawings, which are incorporated herein and form part of the specification, illustrate various embodiments.

FIGS. 4A and 4B illustrate various results.

FIG. 4C illustrates an example physical network topology.

FIGS. 5A and 5B illustrate various results.

FIG. 5C illustrates an example physical network topology.

DETAILED DESCRIPTION

This disclosure describes a process for increasing the speed of a decentralized, D2D ML model training process performed by a ML system that comprises a group of computing devices where each computing device (or "device" for short) is communicatively connected to at least one of the other devices in the group via a network link. Hence, the group of devices and network links can be represented by a communication graph. Given the topology of this communication graph and network link information, a sparse subgraph can be determined and used to speed up the training process of a global ML model. The proposed process retains the training convergence rate of FDLA while enforcing graph sparsity and avoiding the selection of poor links. The total training time is reduced with shorter per-iteration training latency.

Figure 1:
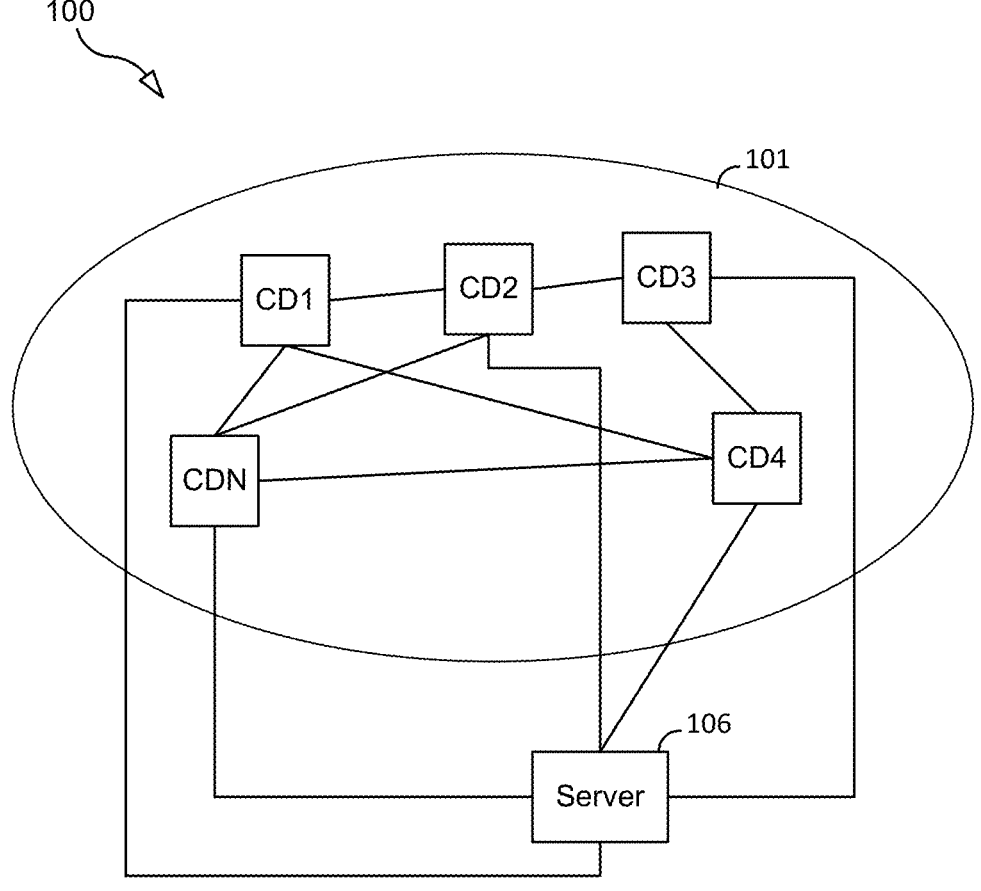
FIG. 1 illustrates a ML system according to an embodiment.

FIG. 1 illustrates a ML system 100 according to an example embodiment. ML system 100 includes a group of communication devices (CDs) 101 (i.e., CD1, CD2, CD3, CD4, . . . , CDN) and a server 106. In the example shown, each CD is connected to at least one other CD via a network link. For example, a first network link connects CD1 with CD2, a second network link connects CD1 with CD4, and a third network link connects CD1 with CDN. The group of CDs 101 forms D2D network. In the example shown, each CD is also communicatively connected to server 106, which may be an edge server. Each CD may be communicatively connected to server 106 via an access network (e.g., a Long Term Evolution (LTE) access network, a 5G access network, etc.).

In one embodiment, to facilitate direct D2D communications, the CDs use orthogonal channels to communicate with one or more neighboring CDs, and the server 106 is responsible for managing the CDs and controlling the direct D2D communication. The control signalling edge server 106 to CD may be done through an operator network. Message transfer between any two CDs may be done through a sidelink established between the two CDs or may be done through the operator network.

The basic topology of the group of CDs can be depicted as an undirected graph $G=(\mathcal{N},\varepsilon)$, where $\mathcal{N}$ is the set of CDs and $\varepsilon$ is the edge set and $(i,j)\in\varepsilon$, if there exists a link between CD i and CD j.

The CDs participate in training a global model for a synchronized distributed learning task. In each training iteration, each CD calculates local gradients of the training model using their local datasets. Then, each CD updates its local model through gradient descent with a weighted average of neighbors' model estimates (including itself). The training process repeats until the convergence of the training model or reaching some prescribed maximum number of training iterations.

To speed up the training process in wall-clock time, the consensus weight matrix and communication resource allocation scheme are designed efficiently and effectively. In other words, the goal is to have a sparse network for the message exchange among the CDs participating the distributed ML training process. Arbitrary link reduction within the D2D network, however, might lead to difficult to converge or even a divergence of the ML model training process in each CD.

Hence, to guarantee the convergence of the training process, the following common assumptions can be made: i) the local loss functions are convex with their gradients bounded by a constant L; ii) there exist global optimal model parameters; iii) the graph G is connected (or connected over each period) and the consensus weight matrix (W) is doubly stochastic; iv)

$$\rho(W) = \left\| W - \frac{11^T}{N} \right\|_2 < 1$$

guarantees that the learning models converge and a smaller $\rho(W)$ suggests a better network consensus; v) the total allocated resource of the selected links should not exceed a resource budget.

To speed up the training process, W and communication resource allocation scheme B given the basic topology A and network information (i.e., a latency function $L_{i,j}$) are jointly designed. The problem of joint consensus weight matrix design and communication resource allocation can be formulated as follows:

$$P0: \min_{W,B} \frac{1}{1 - p(W)} g(W, B)$$

$$\text{s.t. } \sum_{i,j \in N} B_{i,j} \leq \overline{B} \qquad \text{(constraint 1)}$$

$$0 \leq B_{i,j} \leq \overline{B} \qquad \text{(constraint 2)}$$

$$W1 = 1 \qquad \text{(constraint 3)}$$

$$W = W^T \qquad \text{(constraint 4)}$$

$$W \in S_A \qquad \text{(constraint 5)}$$

where the objective function denotes the theoretical upper bound of the training wall-clock time, $$g(W, B) = \max_{i,j \in N} \left\{ L_{i,j}(B_{i,j}) 1_{\{W_{i,j} > 0\}} \right\}$$

is the per-iteration latency, $$L_{i,j}(B_{i,j}) = l_i^P + l_{i,j}^C = \frac{\xi_i}{\mu_i} + \frac{D_i}{B_{i,j}\eta_{i,j}}$$

is the latency function of the link from CD i to j, $$l_i^P$$

denotes the processing latency of CD i, $$l_{i,j}^C$$

denotes the communication latency from CD i to j, and $$l_{i,i}^C = 0,$$

$\xi_i$ denotes the computation intensity required at CD i,
$\mu_i$ denotes the computation capacity of CD i,
$D_i$ is the size of the packet sent by CD i to CD j ($D_i$=0 if CD i is not connected to CD j).
$B_{i,j}$ is the bandwidth allocated to the link from CD i to j,
$\eta_{i,j}$ is the spectrum efficiency of the link from CD i to j,
$1_{(\cdot)}$ is an indicator function, and B is the resource budget,
$1=[1, 1, \ldots, 1]^T$ is the all-one column vector.

Constraints (1)-(2) state that the total allocated resource should not exceed the resource budget. Constraint (3) states that the elements of each row vector in W sum to one. Constraint (4) states a symmetric W for the undirected graph. Therefore, the sum of each column vector in W also equals one. Note that directed graph is also applicable in this work by simply substituting constraint (4) with $1^TW=1^T$ (see reference [4]). Constraint (5) shows the selected links are restricted by the basic topology, i.e., an adjacency matrix A, and $S_A=\{W\in \mathbb{R}^{N\times N}|W_{i,j}=0 \text{ if } A_{i,j}=0 \text{ and } i\neq j\}$.

In D2D learning, coefficients $\xi_i$ and $D_i$ are determined by the model we select to train and the CDs process and transfer this shared model. For example, in anomaly detection, different models, e.g., support vector machine and neural networks, correspond to different coefficients in the latency function.

Due to the existence of the indicator function, the objective function of P0 is no longer convex with respect to W. Moreover, due to the vast search space, the greedy algorithm is computationally expensive. Furthermore, it is difficult to derive the closed form of the (sub) gradients of the spectral norm, making the gradient-based solutions to non-convex optimization inapplicable to P0, e.g., successive convex approximation and majorization minimization.

Figure 2:
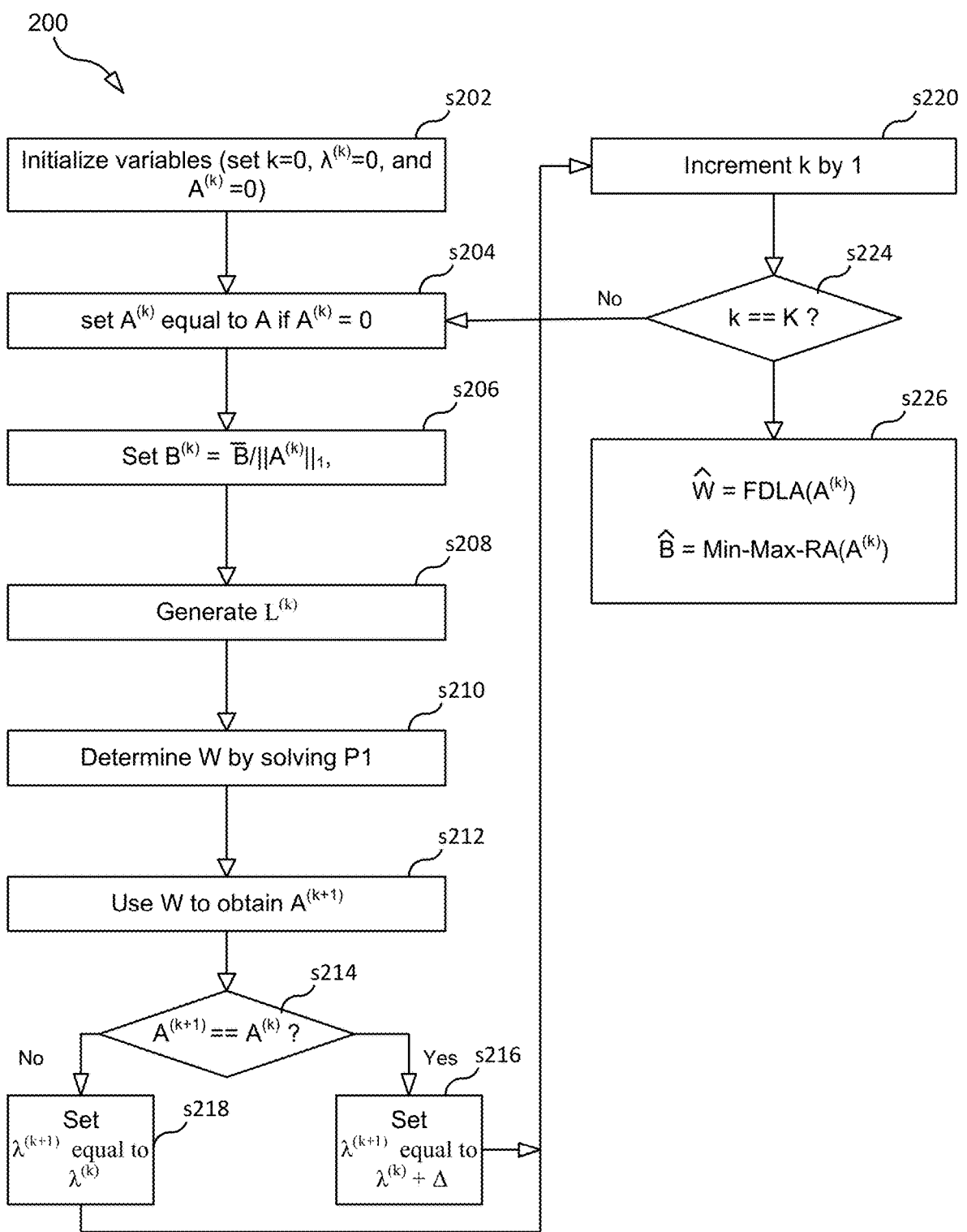
FIG. 2 is a flowchart illustrating a process according to some embodiments.

FIG. 2 is a flowchart illustrating a ML process 200, according to an embodiment, for increasing the speed of a decentralized, D2D ML model training process performed by ML system 100. Process 200 finds the right topology for distributed learning by considering graph sparsity and the inherent goodness of the links. Once the topology is found (i.e., once the links are selected), P0 is naturally decomposed into two convex subproblems by separating the two decision variables (Wand B). This can be solved efficiently through convex optimization. Here, computation capacity of the CDs and channel conditions are known and constant. At each iteration k of the training process the following steps are performed. Process 200 may begin with step s202 and assumes that the group of CDs consists of N CDs.

Step s202 is an initialization step that comprises setting k=0, $\lambda^{(k)}$=0, and $A^{(k)}$=0.

Step s204 comprises setting $A^{(k)}$ equal to A if $A^{(k)}$=0, where A is an adjacency matrix that, for each CD in the group of CDs 101, indicates the other CDs to which the CD is connected via a link. Thus, given N CDs in the group of CDs 101, A is an N×N matrix where $A_{i,i}$=0 and $A_{i,j}$ is equal to 1 if CDi is connected to CDj via a link, otherwise $A_{i,j}$=0.

Step s206 comprises setting $B^{(k)}=\overline{B}/\|A^{(k)}\|_1$, where B is a resource budget (e.g., an available bandwidth) and $\|A^{(k)}\|_1$ is the number of elements of $A^{(k)}$ that have a value of 1.

Step s208 comprises generating an N×N latency matrix ($L^{(k)}=[L_{i,j}]$). For example, the following code can be used to generate $L^{(k)}$:

```
for (i=1, i≤N, i++){
    for (j=1, j≤N, j++){
        if (i = = j)
            L_ij = 0;
        else
```

$$L_{i,j} = \frac{\xi_i}{\mu_i} + \frac{D_i}{B^{(k)}\eta_{i,j}}$$

```
    }
}
If CD i is not connected to CD j, then Di can be set to zero and n_i,j can
be set to 1.
```

Step s210 comprises determining a weight matrix W by solving P1, where $$P1: \min_{W\in S_{A^{(k)}}} \lambda^{(k)}\left\|W - \frac{11^T}{N}\right\|_2 + \left\|L^{(k)}\otimes W\right\|_1.$$

Solving P1 enforces graph sparsity and avoids selecting bad links. P1 is a tradeoff between the convergence factor, $$\left\|W - \frac{11^T}{N}\right\|_2,$$

and weighted graph sparsity, $\|L^{(k)}\otimes W\|_1$. The L–1 norm encourages sparsity of W by zeroing out the elements in W. Furthermore, to differentiate the links when enforcing graph sparsity, we propose to weight each link using a network state matrix $L^{(k)}$, which reflects the state (e.g., quality) of the links. Since P1 is convex in W, it can be efficiently solved through semidefinite programming. Accordingly, instead of directly solving the non-convex P0 with large search space, we propose to tackle the sparse graph design to a convex problem P1, which can be solved efficiently. In one embodiment, the matrix $L^{(k)}$ is a latency matrix, and when $L^{(k)}$ is estimated, equal bandwidth allocation was used in order to capture the inherent goodness of the links. In particular, if one applies Min-max Resource Allocation, i.e., Min-Max-RA( ), to optimize the bandwidth allocation and obtain the latency matrix $L^{(k)}$, such optimal latency would be equal for all links. After obtaining $W^{(k)}$ by solving P1, step s212 is performed.

Step s212 comprises obtaining $A^{(k+1)}$ by replacing non-zero elements of the weight matrix W with ones and diagonal elements as zeros. That is:

```
for (i=1, i≤N, i++){
    for (j=1, j≤N, j++){
        if (i = = j OR W_ij = = 0)
            A_ij = 0;
        else
            A_ij = 1;
    }
}
```

Step s214 comprises determining whether $A^{(k+1)}=A^{(k)}$. If $A^{(k+1)}=A^{(k)}$, then in step s216 $\lambda^{(k+1)}$ is set equal to $\lambda^{(k)}+\Delta$, where $\Delta$ is a predetermined constant, otherwise in step s218 $\lambda^{(k+1)}$ is set equal to $\lambda^{(k)}$. That is, if the adjacency matric $A^{(k+1)}$ changes, the process continues by further extracting a sparser graph with the current scale coefficient $\lambda^k$. If $A^{(k+1)}$ does not change, the convergence factor is retained by increasing the scale coefficient with A.

Step s220 comprises incrementing k by 1 (i.e., k is set equal to k+1).

Step s222 comprises determining whether k is less than K, where K is a predetermined value. If k is less than K, then process 200 proceeds to back to step s204, otherwise process 200 proceeds to step s224.

When k=K the loop terminates. Using the extracted sparse topology $A^{(K)}$, the corresponding consensus weight matrix design W and communication resource allocation scheme B can be obtained by solving the spectral norm minimization and min-max resource allocation (Min-Max-RA) problems, respectively (step s224). There are known algorithms to solve these problems, e.g., FDLA (see reference [4]) and the primal-dual Lagrangian approach (see reference [9]). FDLA( ) and Min-Max-RA( ) corresponds to the algorithms that solve the spectral norm minimization and min-max resource allocation problems, respectively. Since they are convex problems, they can be efficiently solved.

Figure 3:
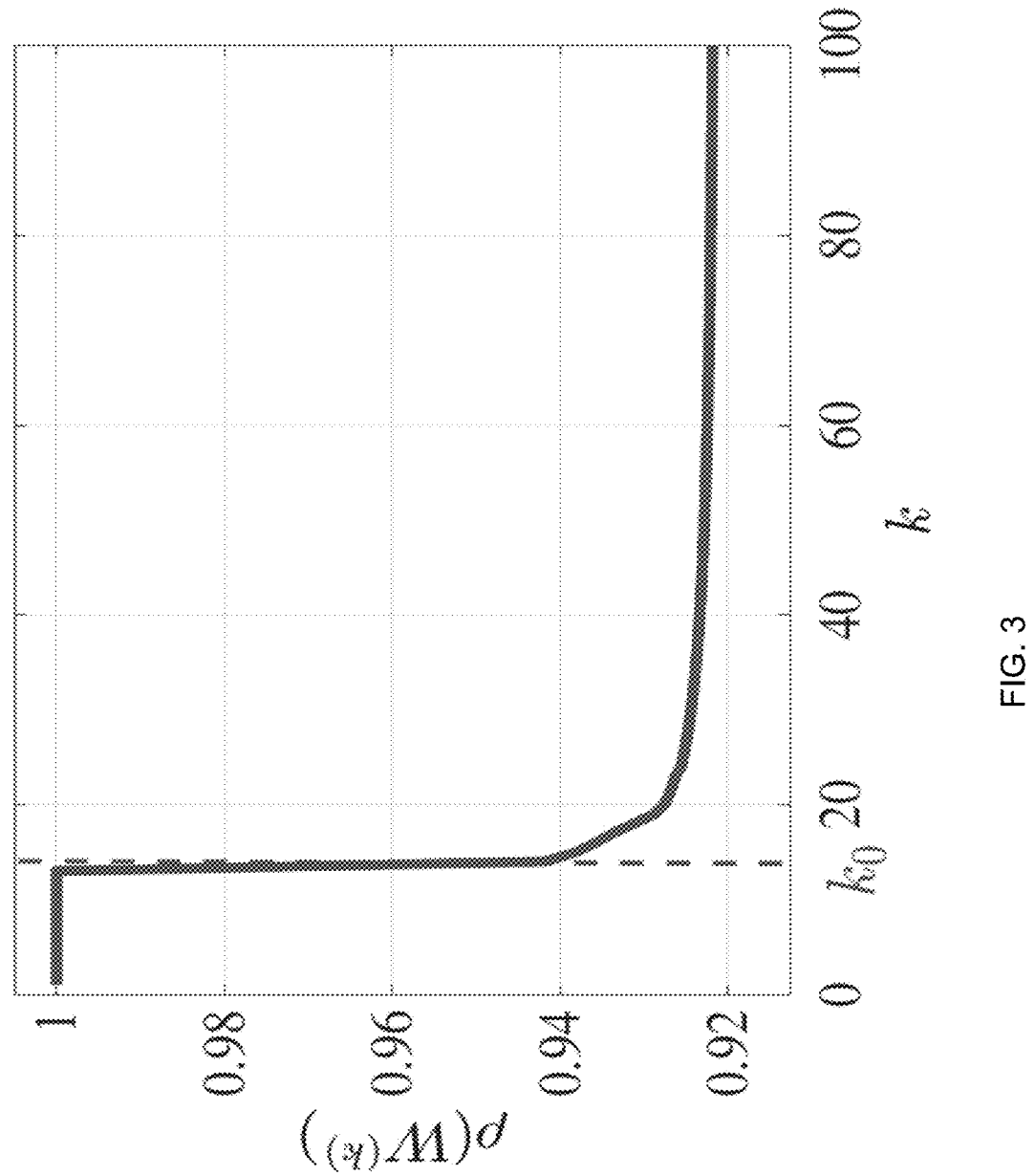
FIG. 3 shows the convergence of the ML process.

Since $$\rho(W) = \left\| W - \frac{11^T}{N} \right\|_2 < 1$$

guarantees the convergence of distributed learning, it can be shown that the extracted topology satisfies $\rho(W^{(K)})<1$, given that the physical network topology A is connected. FIG. 3 shows that process 200 converges a few steps after $k_0$.

Performance Evaluation:

The performance of process 200 is compared with that of the following benchmarks in reference [4]: (1) Max-degree (each edge is set with the same weight based on the maximum degree of the graph); (2) Metropolis (each edge is set with a weight based on the maximum degree of two adjacent CDs); (3) Best-constant (each edge is set with the same weight based on the optimal constant weight based on the eigenvalues of the Laplacian matrix of the graph); and FDLA (he consensus weight matrix is calculated by solving the spectral norm minimization problem; this is the fastest convergence rate w.r.t. the number of training iterations).

In small scale network with 8 CDs, we can calculate the optimal solution through exhausted search. We observe that process 200 achieves the optimal solution as OPT and obtains the same (fastest) convergence rate as FDLA, as shown in FIG. 4A and FIG. 4B. With fewer edges selected for communications, process 200 further reduces the latency in each training iteration. Although those commonly used heuristics fully utilize all physical links, it is revealed that a properly designed sparse network can also achieve efficient consensus for distributed learning. FIG. 4C shows the physical network topology consists of both the solid and dot edges. Only solid edges are selected by process 200. It turns out that 7 out of the 12 edges can achieve the fastest convergence rate with greatly reduced communication latency in each training iteration. In summary, process 200 efficiently enforces the graph sparsity with reduced communication latency and, meanwhile, retains a comparable convergence factor with FDLA.

The performance on a network with 50 CDs is shown in FIG. 5A. Although sacrificing a certain convergence rate in FIG. 5A when compared with the lower bound FDLA, process 200 still retains a significantly better training time than other heuristics in FIG. 5B. When compared with the first four benchmarks, process 200 reduces the training time by 85%, 74%, 73%, and 51%, respectively. Moreover, as shown in FIG. 5C only 40% of the edges are selected by process 200 to achieve a similar level of consensus when compared with FDLA.

Figures 6A, 6B, 6C:
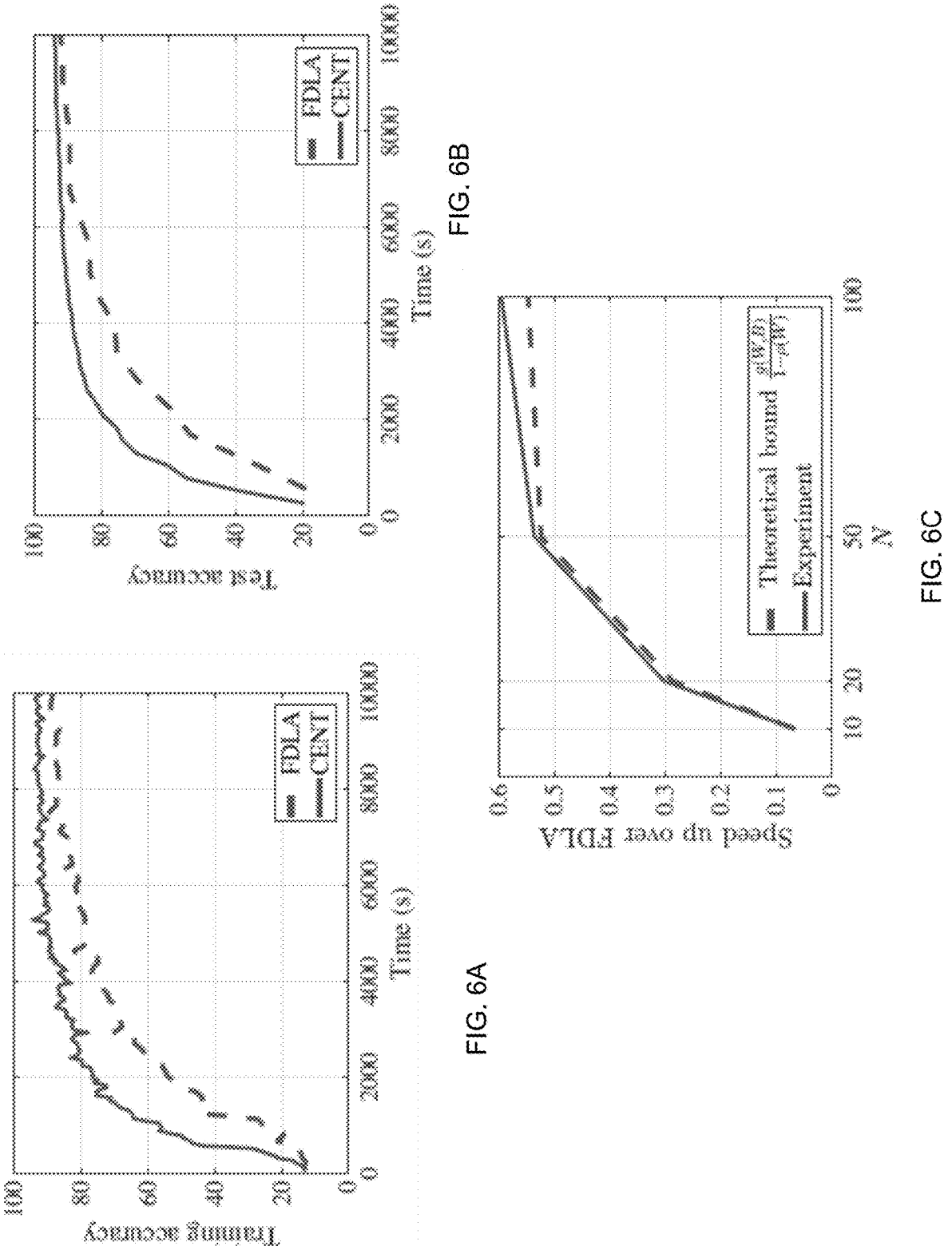
FIGS. 6A, 6B, and 6C illustrate various results.

So far, the results of different consensus weight matrix designs in terms of the theoretical bound of training time has been discussed. Now the practical training time of the implemented distributed convolutional neural network (CNN) training is shown. FIG. 6A and FIG. 6B show the training and test accuracy over time, respectively. We observe that FDLA does not necessarily lead to the fastest convergence speed in practice in terms of the wall-clock time. The performance of process 200 is in line with the observations in existing work that a sparse network may converge faster. With fewer edges selected for communications and reduced latency in each training iteration, process 200 spends the minimum time to achieve the same level of training accuracy. It is also worth pointing out that, in practice, with different realizations of the system setup, there does not exist a consensus weight matrix that strictly outperforms the other weight matrices in all situations. Because the training performance is also affected by the problem characteristics, learning algorithms, and even the design of local datasets, etc. However, it is of importance that process 200 addresses the role of sparse consensus weight matrix design in speeding up distributed learning.

FIG. 6C shows the speed up over FDLA under different network scales with the same bandwidth budget. For a fair comparison, the batch size is adjusted by the number of CDs in order to maintain the overall batch size of 256. In theory, the speed-up is calculated w.r.t. the value of an objective function. In the experiment, the speedup is calculated by comparing the time to achieve the same level of training accuracy. With more CDs sharing the same resource pool, the communication cost gradually overweighs the computation cost and thus the speed-up is mainly due to the reduced per-iteration latency with efficient sparse graph design. The slope of the speed-up decreases due to the scarcity of bandwidth resources. Furthermore, this reflects the fact that the convergence factor is prioritized when the network is rich in communication resources. While in a large-scale network, a sparser network can achieve the same level of convergence rate with reduced latency in each training iteration. However, with limited communication resources, blindly increasing the number of CDs aggravates network congestion, canceling out the benefits of parallel computing.

Figure 7:
FIG. 7 is a flowchart illustrating a process according to some embodiments.
Figure 7:
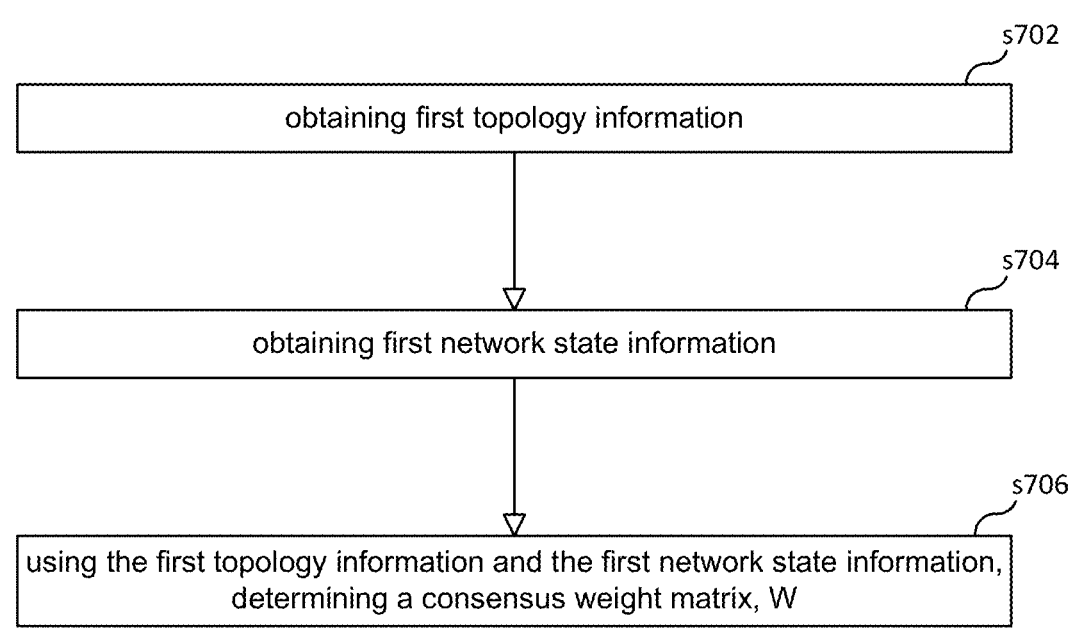

FIG. 7 is a flowchart illustrating a process 700, according to an embodiment, for distributed machine learning, ML, using the set of N CDs 101. Process 700 may begin in step s702.

Step s702 comprises obtaining first topology information (e.g., an adjacency matrix (A)), wherein, for each CD included in the set of N CDs, the first topology information identifies other CDs included in the set of N CDs to which the CD is connected (e.g., as shown in FIG. 1, CD1 is connected to CD2, CD4, and CDN and CD2 is connected to CD1, CD3, and CDN), thereby identifying a set of CD pairs.

Step s704 comprises obtaining first network state information (denoted $L^{(k)}$) (e.g., a latency matrix), wherein, for each CD included in the set of N CDs, the first network state information comprises a network state vector for the CD, wherein the network state vector for the CD comprises, for each other CD to which the CD is indicated as being connected by the first topology information, a determined network state value (e.g., a performance indicator, such as, for example, any one or a combination of: a latency value, a packet loss value, a congestion value, a load value, a capacity value, etc.).

Step s706 comprises determining a consensus weight matrix (e.g., ($\hat{W}$)) using the first network state information and the first topology information. In some embodiments, the process also includes determining the communication resource matrix ($\hat{B}$) using the first network state information and first topology information.

In some embodiments, the set of N CDs comprises a first CD and a second CD, the topology information indicates that the first CD is connected to the second CD via a first link, and determining the network state values comprises calculating a first network state value ($L_{1,2}$) associated with the first CD and the second CD. For example, in the embodiment where the network state values are latency values, then $L_{1,2}$ may be determined by calculating: $L_{1,2} = L_{1p} + CL_{1,2}$, wherein $L_{1p}$ is a processing latency of the first CD, and $CL_{1,2}$ is a latency associated with the first link connecting the first CD with the second CD. In some embodiments, the process also includes obtaining network bandwidth budget information indicating a network bandwidth budget (e.g., $\overline{B}$); and determining an amount of bandwidth ($B_{1,2}$) to allocate to the first link, wherein $B_{1,2}$ is a function of the network bandwidth budget, and $CL_{1,2}$ is a function of $B_{1,2}$.

In some embodiments, for each CD included in the set of N CDs, the topology information comprises a topology vector for the CD, wherein the topology vector for the CD comprises, for each other CD included in the set of N CDs, a value indicating whether or not the CD is connected to the other CD.

In some embodiments, determining the consensus weight matrix using the first network state information and first topology information comprises using the first network state information and the first topology information, determining an intermediate consensus weight matrix (W1) and determining W using W1. In some embodiments, determining the consensus weight matrix based on W1 comprises: determining second topology information (e.g. $A^{(k)}$) using W1, wherein the second topology information identifies a subset of the set of CD pairs identified by the first topology information; determining whether a counter has reached a threshold value; and as a result of determining that the counter has reached the threshold value, determining the consensus weight matrix using the second topology information (e.g., solving FDLA ($A^{(k)}$), wherein $A^{(k)}$ is the second topology information). In some embodiments, the process also includes determining a communication resource matrix $\hat{B}$ using the second topology information (e.g. solving Min-Max-RA($A^{(k)}$)).

In some embodiments, determining the consensus weight matrix based on W1 comprises: determining second topology information using W1; calculating a factor (e.g., $\lambda^{(k)} + \Delta$); determining whether the second topology information is equal to the first topology information; as a result of determining that the second topology information is equal to the first topology information, using the factor to determine a second intermediate joint consensus weight matrix, W2; and determining W using W2.

In some embodiments, W1 is an N×N matrix comprising a set of values $W1_{i,j}$ for i=0 to N and j=0 to N, and the second topology information is an N×N adjacency matrix, A2, comprising a set of values $A2_{i,j}$ for i=0 to N and j=0 to N, and determining A2 using W1 comprises: setting $A2_{i,j}=1$ as a result of determining that $W1_{i,j}>0$, otherwise setting $A_{i,j}=0$.

In some embodiments, the process also includes providing at least a first portion of the consensus weight matrix to a first CD included in the set of N CDs, wherein the first CD is configured to use the first portion of consensus weight matrix to determine model parameters for a first local ML model; providing at least a second portion of the consensus weight matrix to a second CD included in the set of N CDs, wherein the second CD is configured to use the second portion of the consensus weight matrix to determine model parameters for a second local ML model; obtaining the model parameters determined by the first and second CDs; and using the obtained model parameters to determine model parameters for a global ML model.

In some embodiments, the network state value comprises a performance indicator value. In some embodiments, the performance indicator value is: a latency value, a packet loss value, a packet re-transmission success rate value, a packet re-transmission success failure rate value, a jitter value, a congestion value, a load value, or a capacity value.

Figure 8:
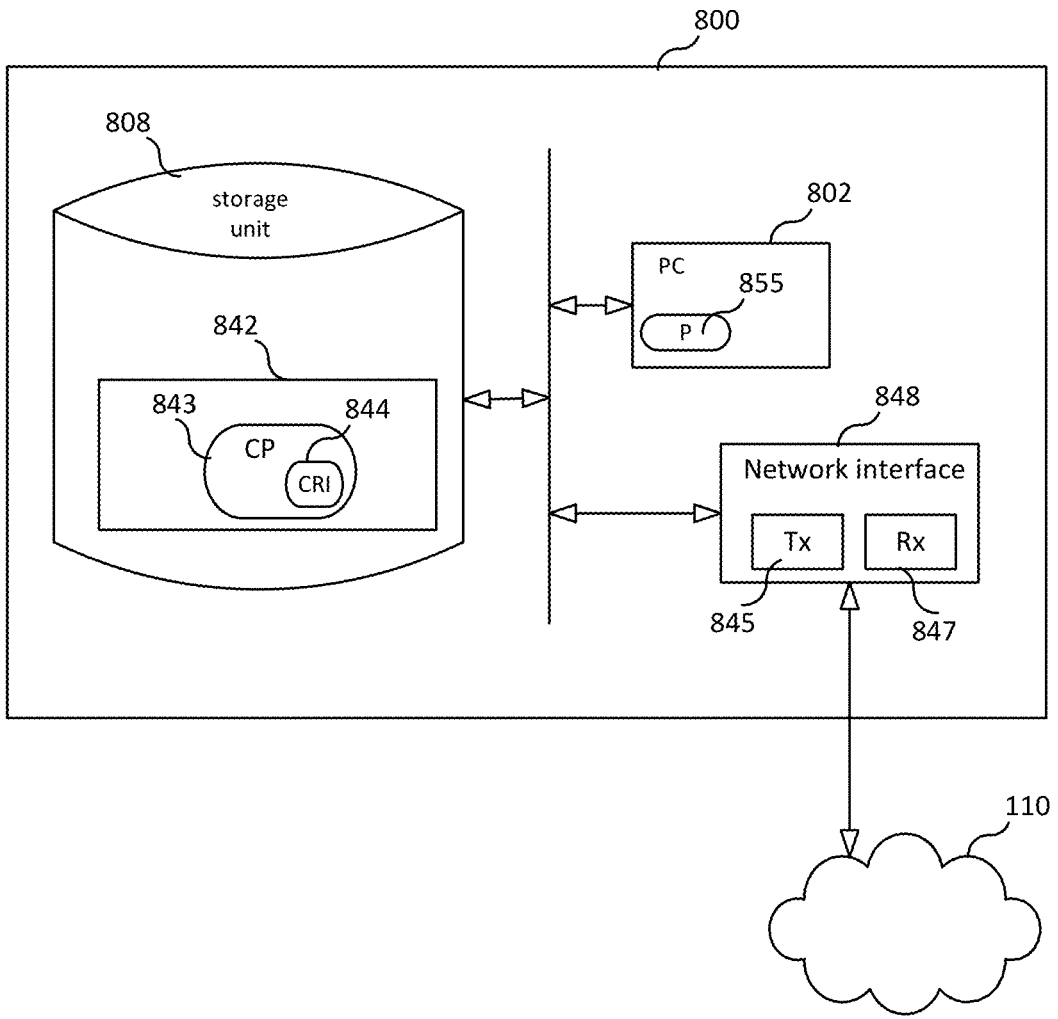
FIG. 8 is a block diagram of a network node according to some embodiments.

FIG. 8 is a block diagram of a network node 800, according to some embodiments, that can implement any one or more of the network nodes described herein. That is, network node 800 can perform the above described methods. As shown in FIG. 8, network node 800 may comprise: processing circuitry (PC) 802, which may include one or more processors (P) 855 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., network node 800 may be a distributed computing apparatus); at least one network interface 848 comprising a transmitter (Tx) 845 and a receiver (Rx) 847 for enabling network node 800 to transmit data to and receive data from other nodes connected to a network 110 (e.g., an Internet Protocol (IP) network) to which network interface 848 is connected (directly or indirectly) (e.g., network interface 848 may be wirelessly connected to the network 110 via an AP and a core network, in which case network interface 848 is connected to an antenna arrangement); and a storage unit (a.k.a., "data storage system") 808, which may include one or more non-volatile storage devices and/or one or more volatile storage devices. In embodiments where PC 802 includes a programmable processor, a computer readable medium (CRM) 842 may be provided. CRM 842 stores a computer program (CP) 843 comprising computer readable instructions (CRI) 844. CRM 842 may be a non-transitory CRM, such as, magnetic media (e.g., a hard disk), optical media, memory devices (e.g., random access memory, flash memory), and the like. In some embodiments, the CRI 844 of computer program 843 is configured such that when executed by PC 802, the CRI causes network node 800 to perform steps described herein (e.g., steps described herein with reference to the flow charts). In other embodiments, network node 800 may be configured to perform steps described herein without the need for code. That is, for example, PC 802 may consist merely of one or more ASICs. Hence, the features of the embodiments described herein may be implemented in hardware and/or software.

CONCLUSION

As described above, there is provided a process that minimizes the total training time with a limited communication resource budget. The total training latency is characterized by multiplying the per-iteration delay with the number of iterations needed to reach the convergence of the global model in distributed learning. In summary, the process produces: i) an optimal sparse topology design for distributed learning to accelerate the training time, ii) smart consensus weight matrix design for information exchange in distributed learning, and iii) efficient communication resource allocation scheme for network communication in distributed learning.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

REFERENCES

[1] A. Dieuleveut and K. K. Patel, "Communication trade-offs for Local-SGD with large step size," in Proc. Advances in Neural Information Processing Systems, vol. 32, pp. 13 601-13 612, 2019.

[2] D. Alistarh, D. Grubic, J. Li, R. Tomioka, and M. Vojnovic, "QSGD: Communication-efficient SGD via gradient quantization and encoding," in Proc. Advances in Neural Information Processing Systems, vol. 30, pp. 1709-1720, 2017.

[3] S. Shi, X. Chu, and B. Li, "MG-WFBP: Efficient data communication for distributed synchronous SGD algorithms," in Proc. IEEE INFOCOM, pp. 172-180, 2019.

[4] L. Xiao and S. Boyd, "Fast linear iterations for distributed averaging," Systems & Control Letters, vol. 53, no. 1, pp. 65-78, 2004.

[5] X. Lian, C. Zhang, H. Zhang, C.-J. Hsieh, W. Zhang, and J. Liu, "Can decentralized algorithms outperform centralized algorithms? A case study for decentralized parallel stochastic gradient descent," in Proc. Advances in Neural Information Processing Systems, 2017, pp. 5336-5346.

[6] Neglia, Giovanni, et al. "The role of network topology for distributed machine learning." in Proc. IEEE INFOCOM, 2019.

[7] M. Chen, H. V. Poor, W. Saad and S. Cui, "Convergence Time Optimization for Federated Learning Over Wireless Networks," in IEEE Transactions on Wireless Communications, vol. 20, no. 4, pp. 2457-2471, 2021.

[8] Z. Meng, H. Xu, M. Chen, Y. Xu, Y. Zhao and C. Qiao, "Learning-Driven Decentralized Machine Learning in Resource-Constrained Wireless Edge Computing," in Proc. IEEE INFOCOM, 2021, pp. 1-10.

[9] K. Srivastava, A. Nedic, and D. Stipanovic, "Distributed bregman-distance algorithms for min-max optimization," in Agent-Based Optimization, Springer Studies in Computational Intelligence, 2013, pp. 143-174.

12

The invention claimed is:

1. A method for distributed machine learning, ML, using a set of N computing devices, CDs, the method comprising:
   obtaining first topology information, wherein, for each CD included in the set of N CDs, the first topology information identifies other CDs included in the set of N CDs to which the CD is connected, and identifying a set of CD pairs;
   obtaining first network state information, wherein, for each CD included in the set of N CDs, the first network state information comprises a network state vector for the CD, wherein the network state vector for the CD comprises, for each other CD to which the CD is indicated as being connected by the first topology information, a determined network state value; and
   using the first network state information and the first topology information, determining a consensus weight matrix, W,
   wherein determining W using the first network state information and the first topology information comprises:
   using the first network state information and the first topology information, determining an intermediate consensus weight matrix, W1; and
   determining W using W1.

2. The method of claim 1, further comprising, using the obtained first network state information and first topology information, determining a communication resource matrix, $\hat{B}$.

3. The method of claim 1, wherein
   the set of N CDs comprises a first CD and a second CD,
   the topology information indicates that the first CD is connected to the second CD via a first link, and
   determining the network state value comprises calculating a first network state value, $L_{1,2}$, associated with the first CD and the second CD.

4. The method of claim 3, further comprising:
   obtaining network bandwidth budget information indicating a network bandwidth budget, B; and
   determining an amount of bandwidth, $B_{1,2}$, to allocate to the first link, wherein
   $B_{1,2}$ is a function of B, and
   a latency associated with the first link connecting the first CD with the second CD, $CL_{1,2}$, is a function of $B_{1,2}$.

5. The method of claim 1, wherein, for each CD included in the set of N CDs, the topology information comprises a topology vector for the CD, wherein the topology vector for the CD comprises, for each other CD included in the set of N CDs, a value indicating whether or not the CD is connected to the other CD.

6. The method of claim 1, wherein determining W based on W1 comprises:
   determining second topology information using W1, wherein the second topology information identifies a subset of the set of CD pairs identified by the first topology information;
   determining whether a counter has reached a threshold value; and
   as a result of determining that the counter has reached the threshold value, determining W using the second topology information.

7. The method of claim 6, further comprising determining a communication resource matrix, $\hat{B}$, using the second topology information.

8. The method of claim 1, wherein determining W based on W1 comprises:

determining second topology information using W1;

determining whether the second topology information is equal to the first topology information;

calculating a factor;

as a result of determining that the second topology information is equal to the first topology information, using the factor to determine a second intermediate joint consensus weight matrix, W2; and determining W using W2.

9. The method of claim 6, wherein

W1 is an N×N matrix comprising a set of values W1i,j for i=0 to N and j=0 to N, and the second topology information is an N×N adjacency matrix, A2, comprising a set of values A2i,j for i=0 to N and j=0 to N, and determining A2 using W1 comprises:

setting A2i,j=1 as a result of determining that W1i,j>0, otherwise setting Ai,j=0.

10. The method of claim 1, further comprising:

providing at least a first portion of W to a first CD included in the set of N CDs, wherein the first CD is configured to use the first portion of W to determine model parameters for a first local ML model;

providing at least a second portion of W to a second CD included in the set of N CDS, wherein the second CD is configured to use the second portion of W to determine model parameters for a second local ML model;

obtaining the model parameters determined by the first and second CDs; and using the obtained model parameters to determine model parameters for a global ML model.

11. The method of claim 1, wherein said network state value is a performance indicator value.

12. The method of claim 11, wherein said performance indicator value is:

a latency value, a packet loss value, a packet re-transmission success rate value, a packet re-transmission success failure rate value, a jitter value, a congestion value, a load value, or a capacity value.

13. A non-transitory computer-readable medium storing thereon a computer program comprising instructions which when executed by processing circuitry of a network node causes the network node to perform the method of claim 1.

14. A network node, the network node comprising processing circuitry and a memory, the memory containing instructions executable by the processing circuitry whereby the network node is configured to:

obtain first topology information, wherein, for each CD included in a set of N CDs, the first topology information identifies other CDs included in the set of N CDs to which the CD is connected, and identifying a set of CD pairs;

obtain first network state information, wherein, for each CD included in the set of N CDs, the first network state information comprises a network state vector for the CD, wherein the network state vector for the CD comprises, for each other CD to which the CD is indicated as being connected by the first topology information, a determined network state value; and determining a consensus weight matrix, W, using the first network state information and the first topology information, wherein determining W using the first network state information and the first topology information comprises:

using the first network state information and the first topology information, determining an intermediate consensus weight matrix, W1; and determining W using W1.

15. A method for distributed machine learning, ML, using a set of N computing devices, CDs, the method comprising:

obtaining first topology information, wherein, for each CD included in the set of N CDS, the first topology information identifies other CDs included in the set of N CDs to which the CD is connected, and identifying a set of CD pairs;

obtaining first network state information, wherein, for each CD included in the set of N CDs, the first network state information comprises a network state vector for the CD, wherein the network state vector for the CD comprises, for each other CD to which the CD is indicated as being connected by the first topology information, a determined network state value;

using the first network state information and the first topology information, determining a consensus weight matrix, W;

providing at least a first portion of W to a first CD included in the set of N CDs, wherein the first CD is configured to use the first portion of W to determine model parameters for a first local ML model;

providing at least a second portion of W to a second CD included in the set of N CDS, wherein the second CD is configured to use the second portion of W to determine model parameters for a second local ML model;

obtaining the model parameters determined by the first and second CDs; and using the obtained model parameters to determine model parameters for a global ML model.

* * * * *